June 18, 1935. W. L. MORRISON 2,005,198
AUTOMOBILE DOOR
Filed June 2, 1933 2 Sheets-Sheet 1

Inventor:
Willard L. Morrison
By Parker Carter Attys.

June 18, 1935.  W. L. MORRISON  2,005,198
AUTOMOBILE DOOR
Filed June 2, 1933  2 Sheets-Sheet 2
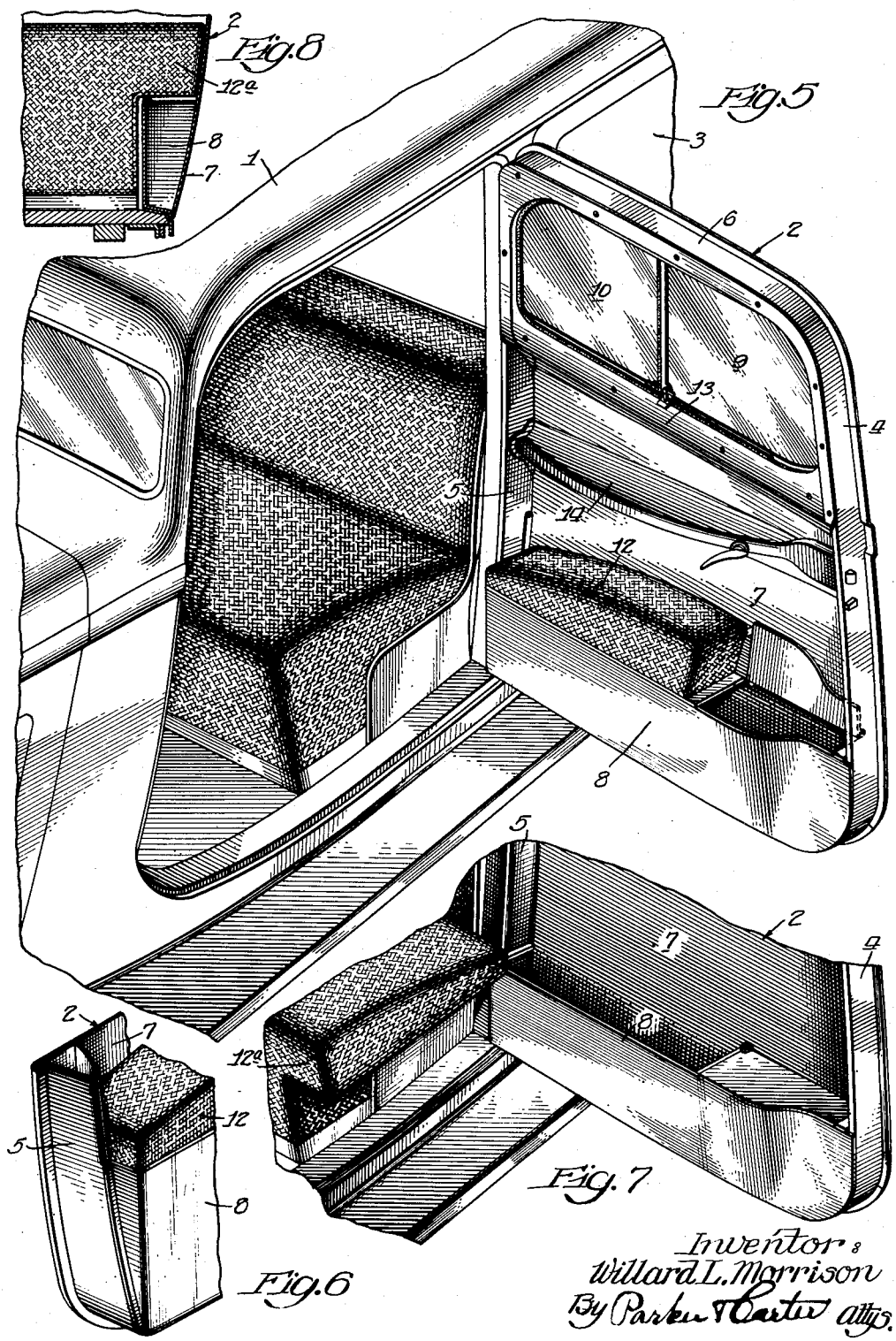

Patented June 18, 1935

2,005,198

UNITED STATES PATENT OFFICE 2,005,198

AUTOMOBILE DOOR

Willard L. Morrison, Chicago, Ill.

Application June 2, 1933, Serial No. 673,937

3 Claims. (Cl. 296—44)

This invention relates to automobile doors and has for its object to provide a new and improved device of this description. The invention has as a further object to provide an automobile door which shall be light in weight, strong and durable, and yet which can be built at a low cost. The invention has as a further object to provide such a door with a single wall leaving space into which a portion of the seat may project. The invention has as a further object to provide a door of this description with a tool box at the bottom and a projecting part on the seat which acts as a cover for the tool box. The invention has other objects which are more particularly pointed out in the accompanying description.

Referring now to the drawings, Fig. 1 is a view showing an automobile having one form of door embodying the invention;

Fig. 5 is a perspective view of the front part of the automobile showing the door open;

Fig. 6 is a view with parts broken away showing the rear end of the tool box and seat portion;

Fig. 7 is a view of the lower part of Fig. 3 showing a modified construction;

Fig. 8 is a view showing a modified construction where the seat portion for the tool box is a permanent part of the seat.

Like numerals refer to like parts throughout the several figures.

Figure 1:
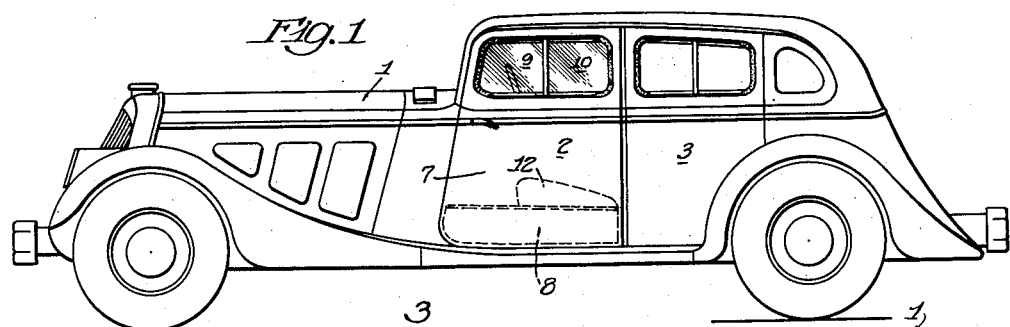
Figures 2, 3:
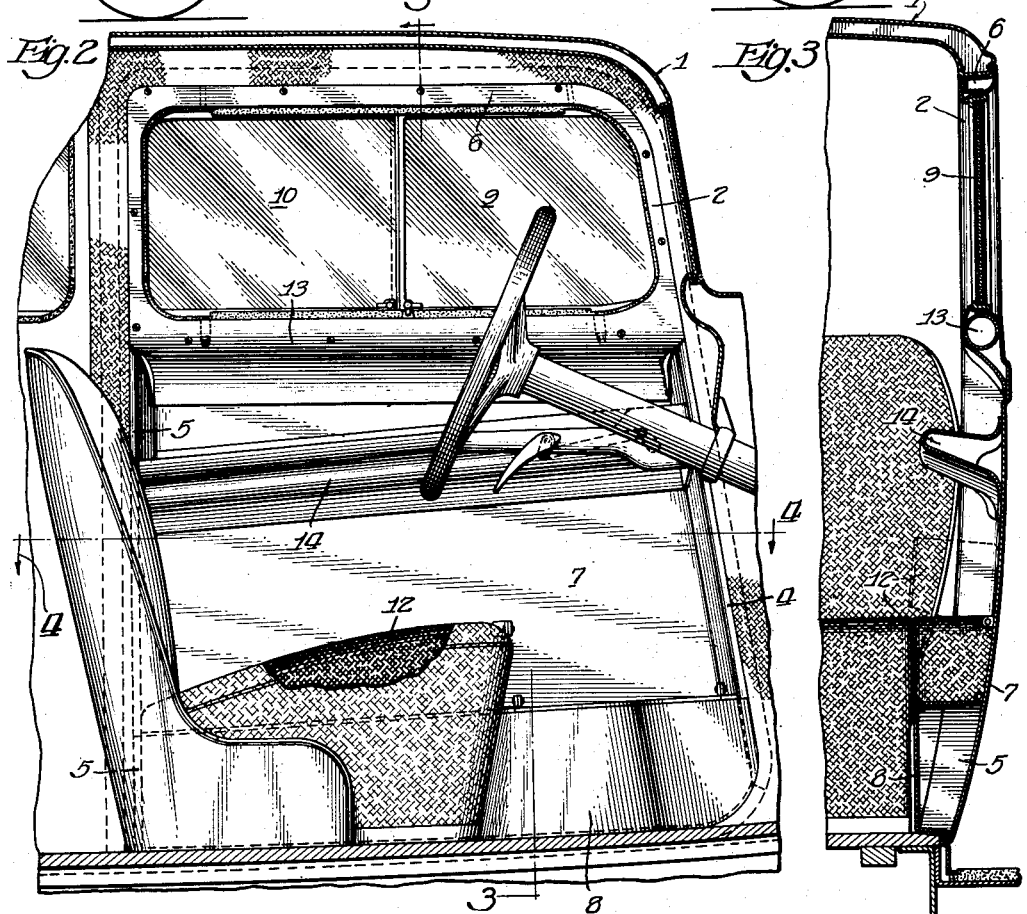
Fig. 2 is a view with parts broken away showing the inside of the door.
Fig. 3 is a sectional view taken on line 3—3 of Fig. 2.
Figure 4:
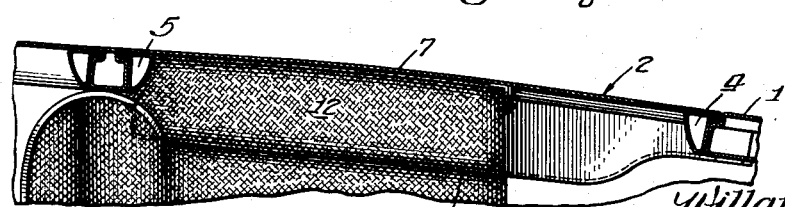
Fig. 4 is a sectional view taken on line 4—4 of Fig. 2.

Referring now to the drawings, I have shown an automobile 1 with front doors 2 and rear doors 3. In this construction the front door 2 has the side frame members 4 and 5 and the top frame member 6. The door has a single outer wall 7 which is connected to the side frame members 4 and 5. The bottom frame member for the door consists of a tool box 8 which extends thereacross on the inside of the single wall 7. This door has at the upper end the deflector sections 9 and 10. The deflector section 9 is pivoted at the top and bottom near its front to the reveal, and the deflector section 10 is pivoted near its rear at the top and bottom to the reveal. This door has a straight top, that is a vertical top portion, as clearly shown in Fig. 3, in which the deflector sections are mounted, but the portion below the deflector sections consists of a single sheet forming the outer wall, thus providing a space for the tool box 8, and also a space for an extension portion 12 of the seat. This seat portion 12 forms the cover for the tool box 9, and in Figs. 5, 6, it is shown as being separate from the seat and hinged to the wall 7 of the door.

In Figs. 7 and 8 I have shown a construction where the extension section 12a of the seat is an integral part of the seat and remains in position when the door is opened. This part 12a, however, projects over the top of the tool box when the door is closed so as to act as a cover therefor. By simply opening the door the cover is removed and the tool box opened, as the seat portion stays in place while the door moves out.

The door below the deflecting sections is provided with a cross brace 13 and there is an arm rest 14 extending across below the deflector sections which acts as a rest for the arm of the driver and which also acts as a brace for the door.

I claim:

1. An automobile construction comprising a door, a seat, a box on the inside of said door at the bottom thereof, an extension part for the seat which projects across the top of the box when the door is closed so as to act as a cover therefor and as an extension for the seat.

2. An automobile construction comprising a door, a box on the inside of said door at the bottom thereof open at the top, a closing device for said box, said closing device being displaced from the top of the box when the door is opened so that the opening of the door automatically opens the box.

3. An automobile construction comprising a door, a seat, a box on the inside of said door at the bottom thereof open at the top, a closing device for said box, said closing device being displaced from the top of the box when the door is opened so that the opening of the door automatically opens the box, said closing device forming a part of the seat.

WILLARD L. MORRISON.